Dec. 21, 1965        M. C. BENNETT                3,224,196
                       REGULATOR
Filed July 27, 1964                              2 Sheets-Sheet 2
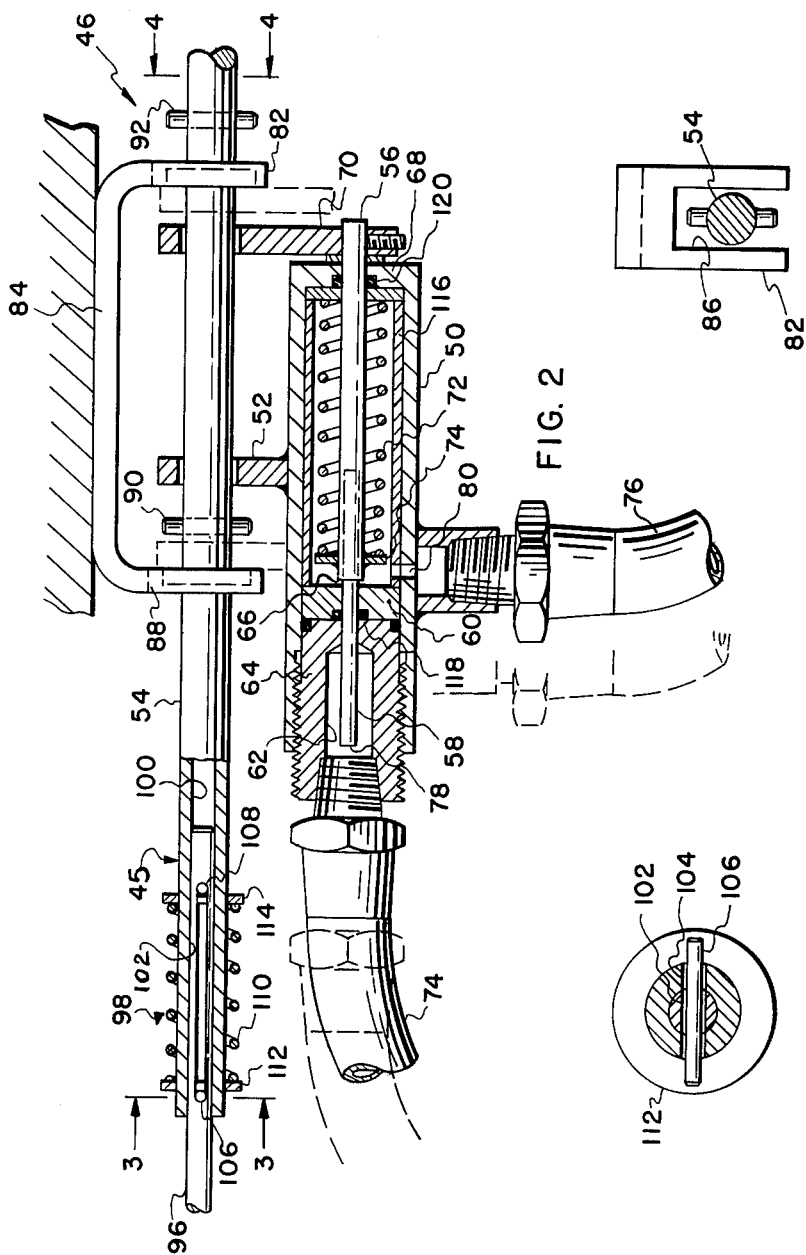
INVENTOR.
MILTON C. BENNETT
BY
ATTY. Emerson B Donnell
AGT. Robert O. Goddard United States Patent Office 3,224,196
Patented Dec. 21, 1965

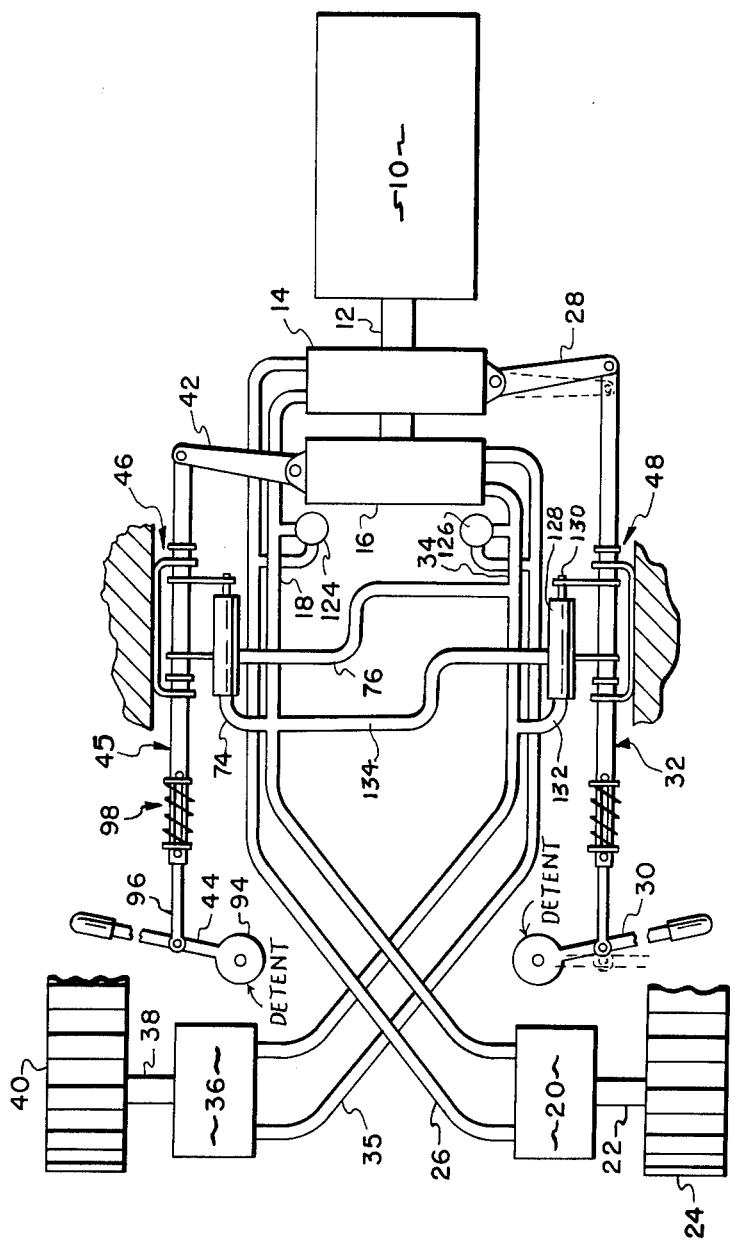

3,224,196
REGULATOR
Milton C. Bennett, Racine, Wis., assignor to J. I. Case Company, Racine, Wis., a corporation of Wisconsin
Filed July 27, 1964, Ser. No. 385,217
9 Claims. (Cl. 60—52)

The present invention relates to regulating devices, particularly for use with hydraulic transmissions of the positive displacement type, and an object of the invention is to generally improve the construction and operation of such devices.

When such transmissions are used on tractive vehicles, they provide a substantially rigid or fixed ratio of rotation between the prime mover and the ground engaging elements, such that an obstruction or exceptionally high resistance to rolling may cause the engine to stall. A typical transmission of the type contemplated includes a pump having means for varying the displacement thereof, and driven by the vehicle engine. The fluid output of the pump is piped into a positive displacement type motor which operates at a rate determined by the ratio of the displacements of the pump and the motor. As stated, an overload on the ground engaging element can cause severe resistance to the operation of the pump, in fact sufficient to stall the engine, and this is accompanied by an extreme rise in pressure in the conduit leading the fluid from the pump to the motor. The situation could be relieved by reducing the displacement of the pump which would have an effect equivalent to shifting a conventional transmission to a lower gear, and it is contemplated that the extreme rise of pressure may be made to cause such reduction to take place automatically, so that the engine will not stall.

Such a transmission would commonly have a relief valve leading out of the conduit leading from the pump so that a dangerous pressure could not be built up in the conduit, and it is further contemplated that the mechanism for reducing the pump displacement may be so graduated that it will reduce the displacement of the pump to zero immediately prior to the relieving of pressure by the relief valve. In this way, the relief valve is prevented from relieving for long periods with accompanying heating of the fluid and other unfavorable results.

Such transmissions are adaptable to tractive vehicles having independent drives to more than one ground engaging element, for example crawler tractors. Such a vehicle would have a motor individual to each of its tracks and a pump connected individually and independently to each of the motors. By manually varying the displacement of the pumps, one track could be made to run at a different speed from the other, resulting in an exceptionally favorable means for steering such a tractor. However, if the hereinbefore mentioned compensating device were applied to each of the pump and motor combinations, there would be difficulty if one of the tracks encountered an obstruction or hard going, in that the compensator on that side would operate to reduce the displacement of that particular pump so that the track encountering the obstruction or hard going would slow down. The tractor then would turn toward the obstruction. Accordingly, it is an object of the invention to provide in such a tractor, a compensator for each pump and motor combination so related that, if one track is slowed by an obstruction causing operation of the compensator, the compensator on the other track will be actuated an equal amount so that the tractor will continue to run sraight in spite of the obstruction.

A further object is to provide compensators for such a tractor which will provide for imposing the entire engine power on one track when desired, but which alter the ratio to avoid stalling the engine when there is resistance on both tracks.

The manner in which these objects are accomplished is fully set forth in the following specification and illustrated in the drawings, in which:

FIGURE 1 is a schematic or diagrammatic view of a typical installation showing a track laying tractor having a hydrodynamic transmission involving a pair of variable displacement pumps, each connected with a positive displacement motor individual to one of the tracks;

FIG. 2 is an enlarged plan view partly in axial section, showing a detail of the mechanism in FIG. 1;

FIG. 3 is an enlarged sectional view on the line 3—3 of FIG. 2;

FIG. 4 is an enlarged sectional view on the line 4—4 of FIG. 2;

Similar reference characters have been applied to the same parts throughout the drawings and specification.

As seen in FIG. 1, the tractor has an engine 10 which drives, through a shaft 12, a first pump 14 and a second pump 16. Pumps 14 and 16 may be of any suitable or conventional type characterized by the fact that they will displace or force a predetermined quantity of fluid into their discharge conduits for every turn of shaft 12, except for minor leakage or "slip." Pump 14 has a first high pressure conduit means 18 which leads to a first positive displacement motor 20, connected by a shaft 22 in driving relation with one of the tracks 24 of the tractor. Spent fluid from motor 20 returns to pump 14 through a low pressure conduit means 26. In this way, motor 20 is driven by reason of the driving of pump 14 by engine 10, and as in the case of pumps 14 and 16, motor 20 is of a type such that a given quantity of fluid forced into it will cause a definite predetermined number of turns of shaft 22. The displacement of pump 14 is regulated in any suitable or conventional manner by shifting of a lever 28 through the action of a hand lever 30, connected to lever 28 by a link generally designated as 32.

In similar manner, fluid from pump 16 flows through a second high pressure conduit 34 to a positive displacement motor 36 connected by a shaft 38 with a track 40, spent fluid returning to pump 16 through a conduit 35. The displacement of pump 16 is varied by shifting of a lever or control means 42 from a hand lever 44 connected to lever 42 by means of a reciprocable element or link generally designated as 45, and extreme shifting of levers 28 and 42 may not only reduce the displacement to zero, but may cause delivery of fluid into conduits 26 and 35, and reverse rotation of motors 20 and 36. It will now be apparent that appropriate shifting of levers 30 and 44 will cause actuation of fluid motors 20 and 36, and accordingly of tracks 24 and 40, either in opposite directions or in the same direction at different speeds (or of course at the same speed), as desired.

Such a tractor would be satisfactory, except that an overload on both of the tracks 24 and 40, would be apt to stall the engine 10, unless a certain amount of skill were exercised by the driver in the handling of levers 30 and 44, and to remedy this defect, compensators generally designated as 48 and 46 are provided associated with links 32 and 45 respectively.

Since the compensators 46 and 48 are preferably alike, it will be necessary to describe only one in detail.

Turning to FIG. 2, compensator 46 comprises a pressure responsive means, or fluid motor including a cylinder 50 having an apertured bracket element 52 slidably supported on a portion of above-mentioned link 45. Cylinder 50 has reciprocable therein, a piston or stem means 56 having a reduced portion 58 passing in fluid-tight manner through a partition 60 into a bore 62 in a plug portion 64 closing one end of cylinder 50. The reduction in size of piston 56 to the diameter of portion 58, provides a shoulder 66 for a purpose to appear. Piston 56 extends in fluid-tight manner through the end 68 or head of cylinder 50 and has fixed thereon an apertured bracket element 70, also slidably supported on above-mentioned portion 54 of link 45. A spring 72 is interposed within cylinder 50 between head 68 and an abutment 74 fixed on piston 56 to urge the latter continually in a leftward direction, as seen in FIG. 2. This movement may be limited if desired by contact of bracket 70 with head 68. A conduit 74 communicates with bore 62 in plug 64, and a conduit 76 communicates with the interior of cylinder 50 on the opposite side of partition 60 from bore 62. It will now be apparent that pressure fluid introduced into bore 62 will act on a pressure sensitive or pressure receiving surface 78 forming the end of reduced portion 58 of stem 56. It will also be apparent that pressure fluid introduced through conduit 76 and into cylinder 50 through a bore 80 will act on above-mentioned shoulder 66 between stem or piston 56 and reduced portion 58. Shoulder 66 is made of equal area with pressure receiving surface 78 for a purpose to appear and constitutes another pressure receiving surface, and it will be apparent that sufficient pressure in either one of conduits 74 or 76 will cause a predetermined amount of compression of spring 72, whereas the same pressure introduced through both conduits 74 and 76 will cause increased compression of spring 72. Spring 72 preferably has an initial compression which will prevent any movement until some predetermined pressure has been developed.

This motion will cause displacement of bracket 70 to the right, as seen in FIG. 2, until it encounters a leg portion 82 of a yoke means 84 fixed on any convenient part of the tractor, and providing an opening 86 through which passes above-mentioned portion 54 of link 45. Yoke 84 has another leg portion 88 spaced to the left of above-mentioned bracket 52, as seen in FIG. 2. When bracket 70 encounters leg 82, further distortion of spring 72 will cause cylinder 50 to be displaced to the left, sliding bracket 52 along portion 54 of link 45.

Assuming link portion 54 in position for forward movement of the tractor, a pin or abutment 90 will be positioned between bracket 52 and leg 88, while another pin or abutment 92 will be positioned beyond leg 82 as related to bracket 70. Continuing distortion of spring 72, as by a continued rise in pressure in either or both of conduits 74 and 76 will cause bracket 52 to encounter pin 90 and press the latter to the left as seen in FIG. 2, thereby shifting portion 54 of link 45 in the direction to reduce the displacement of pump 16, and the extreme position of the parts is indicated in dotted lines wherein bracket 52 is in contact with leg 88, and pin 90 is received in the opening corresponding to 86 in leg 88. The proportions of the parts are such that at this point, the displacement of pump 16 will have been reduced to zero, thus checking any further rise in pressure.

Returning to FIG. 1, it will be noted that lever 44 has a detent 94 which is adapted to prevent shifting of lever 44, except intentionally by the operator. A portion 96 forms a part of link 45 and connects to a slip joint 98, or means providing freedom for portion 54 in spite of the fixed position of lever 44. Portion 96, as seen in FIG. 2 is slidable in a bore 100 in portion 54 and has an elongated slot 102 registering with a similar slot 104, FIG. 3, in portion 54. At the extremities of slots 102 and 104, pins 106 and 108 extend transversely of portions 54 and 96 and are pressed apart by a spring 110, interposed between washers 112 and 114, slidable on portion 54. Movement of portion 96 therefore causes corresponding movement of portion 54 so long as any resistance to movement of portion 54 is less than the force of spring 110. On the other hand, movement of portion 54 may be effected at any time by compensator 46 without interference from portion 96, which, as above indicated, is held stationary by lever 44, the power of piston 56 of compensator 46 being ample to overcome and compress spring 110. Cylinder 50 may have a liner 116, and suitable packings 118 and 120 are provided about portion 58 and stem 56 respectively.

A relief valve 124, FIG. 1, is provided communicating from conduit 18 to conduit 26, and which may be of any suitable type constituted to open upon the occurrence of excessive pressure in conduit 18, and discharge the excess fluid into conduit 26 whence it will be returned to pump 14, thereby relieving the excess pressure. A similar relief valve 126 is connected between conduits 34 and 35 for a similar purpose. As stated, compensator 48 is preferably similar to compensator 46, having a cylinder portion 128 and a stem 130 which acts through brackets similar to brackets 52 and 70, FIG. 2, on link 32 in a manner similar to the action of said brackets 52 and 70 on link 45. Compensator 48 has a conduit 132 leading from conduit 34, and a conduit 134 leading from conduit 18, conduits 132 and 134 corresponding, as related to compensator 48, with conduits 74 and 76, respectively, and being connected into compensator 48 in similar manner to the connections of conduits 74 and 76 into compensator 46.

*Operation*

The operation of the device is apparent from the foregoing, but it pointed out that there are certain highly advantageous characteristics of a device such as that disclosed. It is possible for example to apply the entire power of engine 10 to one track alone. Assuming it is desirable to operate track 40 alone, lever 44 is shifted into the position shown in FIG. 1, while lever 30 is allowed to remain in the dotted or neutral position of FIG. 1. Thus, pump 16 will be operable while pump 14 will be inoperative or neutralized. Pump 16 will then develop sufficient pressure to actuate motor 36 and drive track 40. Since the pumps and motors are of the positive displacement type, pump 16 cannot be driven without forcing fluid into conduit 34, and motor 36 will not permit passage of fluid except with resultant rotation of shaft 38 so that pressure is promptly built up in conduit 34 until motor 36 is caused to turn shaft 38, and such pressure will build up to whatever extent is necessary to overcome any resistance offered by track 40.

In the case of some unusual resistance to movement of track 40, the pressure might become sufficient to cause damage, and relief valve 126 is provided for this situation. It is to be noted that, since pump 14 is neutralized, it offers no substantial resistance to rotation, so that the full power of engine 10 can be applied to pump 16, and which, given sufficient resistance to rotation of track 40 could result in damaging pressures in conduit 34 and all connected parts. Under these conditions, valve 126 would open and discharge the excess pressure to low pressure conduit 35.

Such operation would be highly undesirable because of the discharge of fluid through valve 126 with the extreme drop in pressure between the high and low pressure conduits 34 and 35, which would tend to heat the fluid and cause rapid deterioration of the valve.

Compensator 46 is effective to avoid or prevent this type of undesirable operation.

Whatever pressure is developed in conduit 34 is applied through conduit 76 to pressure sensitive surface 66, FIG. 2, of stem 56, tending to force the latter toward the right, and to compress spring 72. If the pressure becomes sufficient, it will shift bracket 70 into contact with leg 82 and also shift cylinder 50 with bracket 52 toward the left into contact with pin 90. The area of surface 66 and the resistance of spring 72 are such that, when the pressure in conduits 34 and 76 approaches that necessary to actuate or open valve 126, spring 72 will be overcome to the extent that pin 90 will be shifted as hereinbefore described toward the left. Such movement will cause leftward movement of portion 54 and leftward swinging of lever or control 42 to reduce the displacement of pump 16. Such action will reduce the volume of the pumped fluid and will continue until the volume is reduced to the point where no further pressure rise will take place. If the resistance to movement of track 40 is insufficient to stop it entirely, sufficient pressure will be produced and sufficient fluid will be pumped to cause rotation of track 40 to whatever extent is possible by reason of the pressure permitted. If track 40 is blocked, the displacement of pump 16 will be reduced by the above action substantially to zero or merely the amount necessary to supply the normal leakage or "slip" of the pump and motor.

It is to be noted that the pressure in conduit 34 is also transmitted through conduit 132 to cylinder 128 of compensator 48, and will act on a pressure sensitive surface on stem 130 corresponding to surface 78 of stem 56. Since, as stated, surface 66 and surface 78 are equal, compensator 48 will respond to the pressure in conduit 34 to the same extent as compensator 46. However, under the stated conditions there will be no effect on link 32, which is already in neutral, or the position inactivating pump 14. It will be apparent that analogous operation would take place if lever 44 were placed in neutral position and lever 30 displaced to activate pump 14 to drive track 24.

If one of the pumps, for example 14, were adjusted to reverse, or run motor 20 backward, as required for a spin turn, the high pressure would be built up in conduit 26, which is not connected to either compensator. However, pump 16 would normally be adjusted for forward actuation of motor 36, and high pressure would build up in conduit 34. Such pressure would be transmitted to compensator 48 through conduit 132, and if it should become sufficient, would tend to neutralize pump 14 from its reverse position, compensator 48 acting on the pin corresponding to 92, which would have been shifted to the opposite side of leg 82 from that shown in FIG. 2. In this manner, compensators 46 and 48 may act to neutralize pumps 16 and 14 whether they are set to operate in a forward or a backward direction.

Another situation arises when it is desired to run the tractor in a straight path. Under these conditions, lever 44 and lever 30 would both be displaced, as in solid lines in FIG. 1, so that both tracks 24 and 40 would be driven at the same rate, which would cause the tractor to move in a straight path. Assuming now that one track, for example 40 should encounter an obstruction or some condition which would offer extreme resistance to its operation. As heretofore explained, this would result in a rise in pressure in conduit 34, which pressure would also be transmitted through conduit 76 to compensator 46, acting on surface 66 of stem 56 to move it to the right to shift link 45 as previously explained, and reduce the displacement of pump 16. This action, if not counteracted would, by reason of slowing of track 40, cause the tractor to turn toward the left. However, the rise in pressure in conduit 34 is transmitted not only through conduit 76 to compensator 46, but also through conduit 132 to compensator 48. Therefore, compensator 46 would receive actuating pressure from two sources.

First of all, it would receive what might be called the normal pressure from pump 14 through conduits 18 and 74, this pressure acting on surface 78. Compensator 46 would also receive the excess pressure built up in conduit 34 by reason of the obstruction to track 40 through conduit 76, this pressure acting on surface 66. Both of these pressures acting on spindle 56 will add up to compress spring 72 and shift portion 54 in the direction to neutralize pump 16. However, the excess pressure built up in conduit 34 is also transmitted to compensator 48 through conduit 132, while the normal pressure existing in conduit 18 is also transmitted to compensator 48 through conduit 134. Thus, compensator 48 receives the excess pressure from conduit 34 on the surface corresponding to 78 in FIG. 2, and the normal pressure in conduit 18 on the surface corresponding to 66 in FIG. 2. Compensator 46 receives the excess pressure on one surface plus the normal pressure on the other surface, while compensator 48 receives the excess other pressure on the surface corresponding to 78, and the normal pressure on the surface corresponding to 66. As previously stated, surfaces 78 and 66 are equal in area, and it follows that compensator 48 receives the same total pressure against its spring as does compensator 46. Therefore, compensator 48 acts to neutralize pump 14 to virtually exactly the same extent that compensator 46 tends to neutralize pump 16. Thus, motors 36 and 20 receive the same volume of fluid per unit of time, albeit at different pressures, and the result is to actuate the motors and tracks 24 and 40 for all practical purposes, at exactly the same speed in spite of the extra resistance to track 40. The tractor therefore continues to move in a straight path.

In the event of resistance to forward movement of the tractor divided equally between tracks 40 and 24, the same pressures will develop in both conduits 18 and 34, and each compensator will be subjected to the same pressure built up from both conduits 18 and 34. Under these conditions, the pressures against the surfaces 66 and 78 and their equivalents in compensator 48 will all be equal and will cause the same amount of neutralization in both pumps 14 and 16. This neutralization is controlled by the calibration of spring 72 and its equivalent in compensator 48, so as to neutralize both pumps 14 and 16 to the extent necessary to allow engine 10 to continue without stalling.

By reason of the system disclosed, the full poper available in engine 10 may be utilized in the most effective and efficient way possible, the full power being available divided equally between tracks 24 and 40, up to the maximum capacity of engine 10. On the other hand, in a turn or other situation, where one track is utilized alone, the compensator on that side will operate only when substantially twice the pressure has been developed, as would be needed if both tracks were in operation. Thus, the pump which is active will be allowed to build up approximately twice the pressure when working alone, before being neutralized, that it would build up when working with the other pump for straight travel, so as to absorb or utilize substantially the full power of the engine.

It will now be apparent that a compensating system has been devised which will protect the tractor engine from stalling when running straight, and also one which will avoid continuous operation of a relief valve when the full engine power is applied to one traction element. It will also be apparent that the system, while providing the above advantages, will compel the tractor to run straight in spite of excessive resistance to one of the traction elements.

Variations on the above may occur to those familiar with this art, and the invention is not intended to be taken as limited to the structure shown and described, or in fact in any manner except as defined in the annexed claims.

What is claimed as new and desired to be secured by Letters Patent of the United States is:

1. A compensator for a fluid transmission of the type comprising a pair of positive displacement, variable displacement pumps driven from a prime mover and each having a control means shiftable to vary the displacement thereof, a high pressure conduit leading from each pump, a pair of positive displacement motors, each connected to receive pressure fluid from one of said high pressure conduits and also to a movable element to be actuated, said compensator comprising a pair of pressure responsive fluid motors,
  means providing pressure receiving surfaces in each of said pressure responsive fluid motors, and means connected to the first-mentioned means and to one of said controls, means connecting one of said pressure receiving surfaces in each of the last-mentioned fluid motors in pressure receiving relation with one of said high pressure conduits, and means connecting the other of said pressure receiving surfaces in each of said last-mentioned fluid motors in relation to shift one of said control means.

2. A compensator for a fluid transmission of the type comprising a pair of positive displacement, variable displacement pumps driven from a prime mover and each having a control means shiftable to vary the displacement thereof, a high pressure conduit leading from each pump, a pair of positive displacement motors, each connected to receive pressure fluid from one of said high pressure conduits and also to a movable element to be actuated, said compensator comprising a pair of pressure responsive fluid motors, each fluid motor providing a first displacement chamber and a second displacement chamber, adjusting means providing a pressure receiving surface in each of said displacement chambers, and actuating means connected to each of said adjusting means and to one of said controls, means connecting said first displacement chamber of each of said fluid motors in pressure receiving relation with one of said high pressure conduits, and means connecting said second displacement chamber of each of said fluid motors in pressure receiving relation with the other high pressure conduit so as to be responsive to the pressure in either high pressure conduit and to the sum of the pressures in both high pressure conduits.

3. A compensator for a fluid transmission of the type comprising a pair of positive displacement, variable displacement pumps driven from a prime mover and each having a control means shiftable to vary the displacement thereof, a high pressure conduit leading from each pump, a pair of positive displacement motors, each connected to receive pressure fluid from one of said high pressure conduits and also to a movable element to be actuated, said compensator comprising a pair of pressure responsive fluid motors, each fluid motor providing a first displacement chamber and a second displacement chamber, adjusting means providing a pressure receiving surface in each of said displacement chambers, and actuating means connected to said adjusting means and to one of said controls, means connecting said first displacement chamber of each of said fluid motors in pressure receiving relation with one of said high pressure conduits, and means connecting said second displacement chamber of each of said fluid motors in pressure receiving relation with the other high pressure conduit so as to be responsive to the pressure in either high pressure conduit and to the sum of the pressures in both high pressure conduits, and low pressure conduit means connected with each of said positive displacement motors, leading to and connected with each of said pumps for returning spent fluid from said positive displacement motors to said pumps.

4. In a compensator for a fluid transmission of the type comprising a positive displacement variable displacement pump driven from a prime mover and having a control means shiftable to vary the displacement thereof, a high pressure conduit leading from said pump, a positive displacement motor connected to receive pressure fluid from said high pressure conduit and also connected to a movable element to be actuated, said compensator comprising a pressure responsive expansible fluid motor, means connecting the last-mentioned fluid motor in pressure receiving relation with said high pressure conduit, and means connecting said last-mentioned fluid motor in relation to shift said control means, said means including a reciprocable element, said last-mentioned fluid motor providing elements spaced in the direction of the length of said reciprocable element, the spacing being variable by reason of expansion and contraction of said last-mentioned fluid motor, means fixed in relation to the transmission and including spaced legs disposed transversely of said reciprocable element, and abutments on said reciprocable element spaced from each other a distance equivalent to the spacing of said legs, whereby said reciprocable element will be brought to a predetermined position by reason of shifting of said spaced elements into engagement with said legs by actuation of said fluid motor.

5. In a compensator for a fluid transmission of the type comprising a positive displacement variable displacement pump driven from a prime mover and having a control means shiftable to vary the displacement thereof, a high pressure conduit leading from said pump, a positive displacement motor connected to receive pressure fluid from said high pressure conduit and also connected to a movable element to be actuated, said compensator comprising a pressure responsive expansible fluid motor, means connecting the last-mentioned fluid motor in pressure receiving relation with said high pressure conduit, and means connecting said last-mentioned fluid motor in relation to shift said control means, said means including a reciprocable rod connected to said control means, said last-mentioned fluid motor providing a pair of spaced brackets slidable on said rod, the spacing thereof being variable by reason of the expansion and contraction of said last-mentioned fluid motor, a yoke fixed in relation to the transmission and including spaced apertured legs through which said rod extends and is reciprocable, abutment pins on said rod spaced therealong a distance substantially equivalent to the spacing of said legs and resting within the apertures thereof in one position of said rod, to be displaced therefrom when said rod is shifted to another position for actuating said control means, said rod being brought to a position with said pins resting in said apertures by reason of shifting of said brackets, by actuation of said last-mentioned fluid motor, into contact with the legs of said yoke.

6. A compensator for a transmission of the type comprising a first and a second positive displacement variable displacement pump, a prime mover connected in driving relation to said variable displacement pumps, first and second positive displacement motors, first high pressure conduit means connected to said first pump and to said first motor, second high pressure conduit means connected to said second pump and to said second motor, first means for varying the displacement of the first pump, second means for varying the displacement of the second pump, a first manual control connected with the first displacement varying means, a second manual control connected with the second displacement varying means, means providing freedom for actuation of said displacement varying means independently of said manual control, a first pressure sensitive motor connected in actuating relation to said first displacement varying means, a second pressure sensitive motor connected in actuating relation to said second displacement varying means, said pressure sensitive motors each having a first pressure receiving surface and a second pressure receiving surface, independent of said first pressure receiving surface, conduit means connecting the first high pressure conduit means with the first pressure receiving surface in said first pressure pressure sensitive motor, conduit means connecting said
second high pressure conduit with said second pressure receiving surface in said first pressure sensitive motor,
conduit means connecting the first high pressure conduit means with the second pressure receiving surface in said second pressure sensitive motor, conduit means connecting said
second high pressure conduit with said first pressure receiving surface in said second pressure sensitive motor, means in each pressure sensitive motor
shiftable in response to sufficient fluid pressure on said pressure receiving surfaces to adjust its respective displacement varying means in the direction to reduce the displacement of the associated pump, and said shiftable means being so constituted as to be shiftable by fluid pressure on either its first pressure receiving surface or its second pressure receiving surface or both.

7. A compensator for a transmission of the type comprising a positive variable displacement pump, a prime mover connected in driving relation to said pump, means for varying the displacement of said pump, a manual control connected with the displacement varying means for actuating said displacement varying means, means providing freedom for actuation of said displacement varying means independently of said manual control, a second pump, a pressure sensitive
motor having a first pressure receiving surface and a second pressure receiving surface, independent of said first pressure receiving surface, said motor being connected in actuating relation to said displacement varying means, a
positive displacement motor,
conduit means connecting the first mentioned pump with said positive displacement motor, second conduit means connected in relation to receive fluid from said second pump, and
conduit means connecting the first conduit means with said first pressure receiving surface in said pressure sensitive motor,
conduit means connected with said second conduit means and with said second pressure receiving surface in said pressure sensitive motor, and
means connecting said pressure sensitive motor to actuate said displacement varying means, in response to a rise of pressure in said first mentioned conduit means, to
control the displacement of said first mentioned pump.

8. A compensator for a fluid transmission of the type comprising a positive displacement variable displacement pump driven from a prime mover and having a control means shiftable to vary the displacement thereof, a high pressure conduit leading from said pump, a positive displacement motor connected to receive pressure fluid from said high pressure conduit and also connected to a movable element to be actuated, a second pump driven from said prime mover, second conduit means connected in relation to receive fluid from said second pump; said compensator comprising
displacement regulating means having a first pressure receiving surface and a second pressure receiving surface, independent of said first pressure receiving surface, and responsive to more than one output pressure, said regulating means being connected with said high pressure conduit to said first pressure receiving surface and with said second conduit means to said second pressure receiving surface, and
means connecting said displacement regulating means in relation to shift said control means.

9. A regulating assembly for use in a hydraulic transmission having a first pump and a second pump, said first and second pumps being of the variable displacement positive type and driven from a prime mover, a first motor and a second motor, said first and second motors being of the positive displacement type, means connected to said first pump and first motor for conducting fluid therebetween, and means connected to said second pump and second motor for conducting fluid therebetween; said assembly including
control means positioned for varying the displacement of said first pump,
control means positioned for varying the displacement of said second pump, and
pressure compensating means having a first pressure receiving surface connected to said first fluid conducting means and having a second pressure receiving surface, independent of said first pressure receiving surface, and connected to said second fluid conducting means and said compensating means being connected in actuating relation to one of said control means and responsive to the output of said first and second pumps, whereby pressure in said first and second fluid conducting means shifts said pressure compensating means and said control means for varying the output of its respective pump.

References Cited by the Examiner

UNITED STATES PATENTS

| 2,896,411 | 7/1959 | Bowers et al. | 60—53 |
| 3,161,245 | 12/1964 | Thoma | 60—53 X |

EDGAR W. GEOGHEGAN, *Primary Examiner.*